April 5, 1966    C. R. SCHAFER    3,244,897
MEASUREMENT OF THE MASS OF A MATERIAL IN A
CONTAINER BY RADIOACTIVE MEANS
Filed June 27, 1962    3 Sheets-Sheet 1
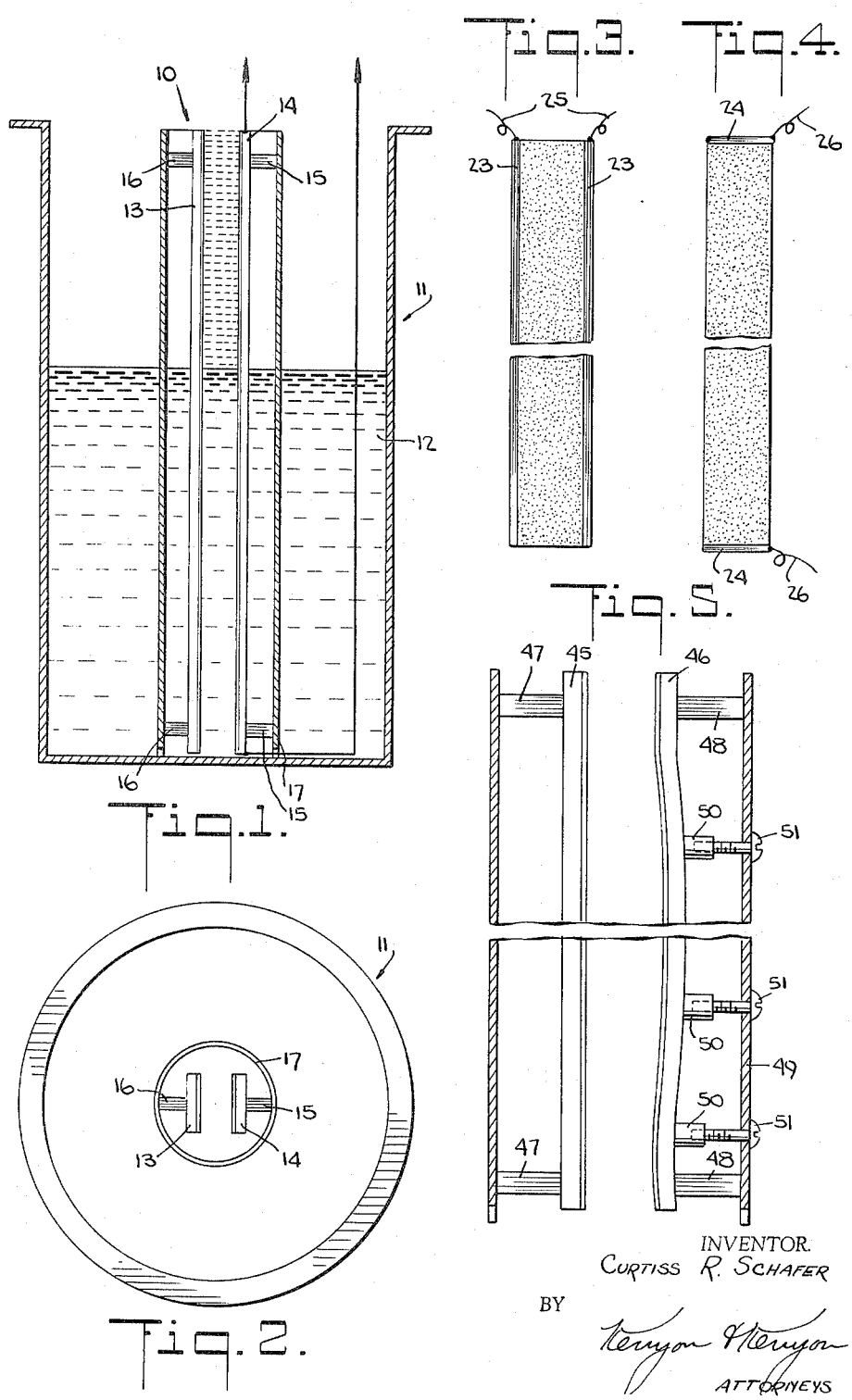
INVENTOR.
CURTISS R. SCHAFER
BY
Kenyon & Kenyon
ATTORNEYS

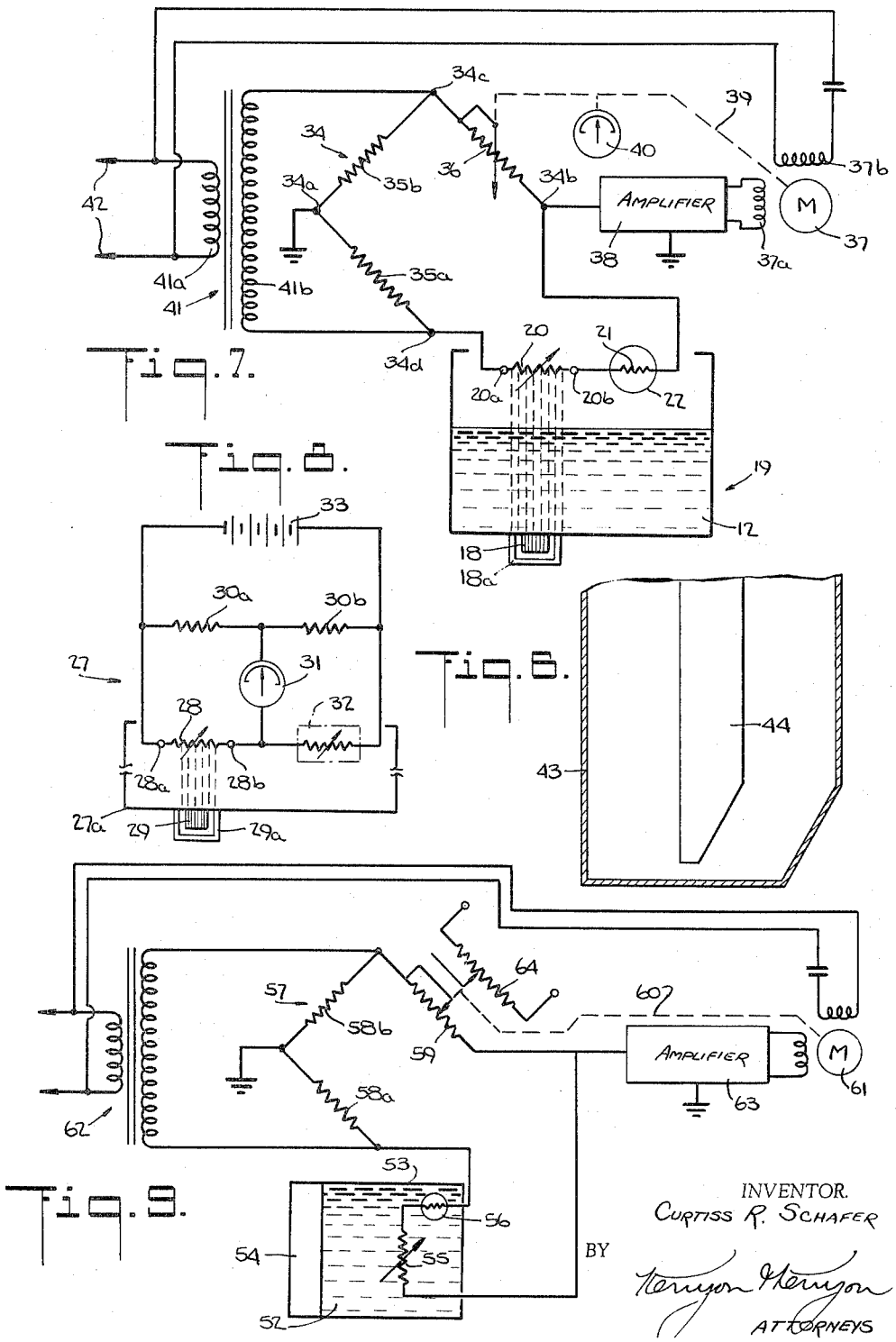

April 5, 1966
C. R. SCHAFER
3,244,897
MEASUREMENT OF THE MASS OF A MATERIAL IN A CONTAINER BY RADIOACTIVE MEANS
Filed June 27, 1962
3 Sheets-Sheet 3
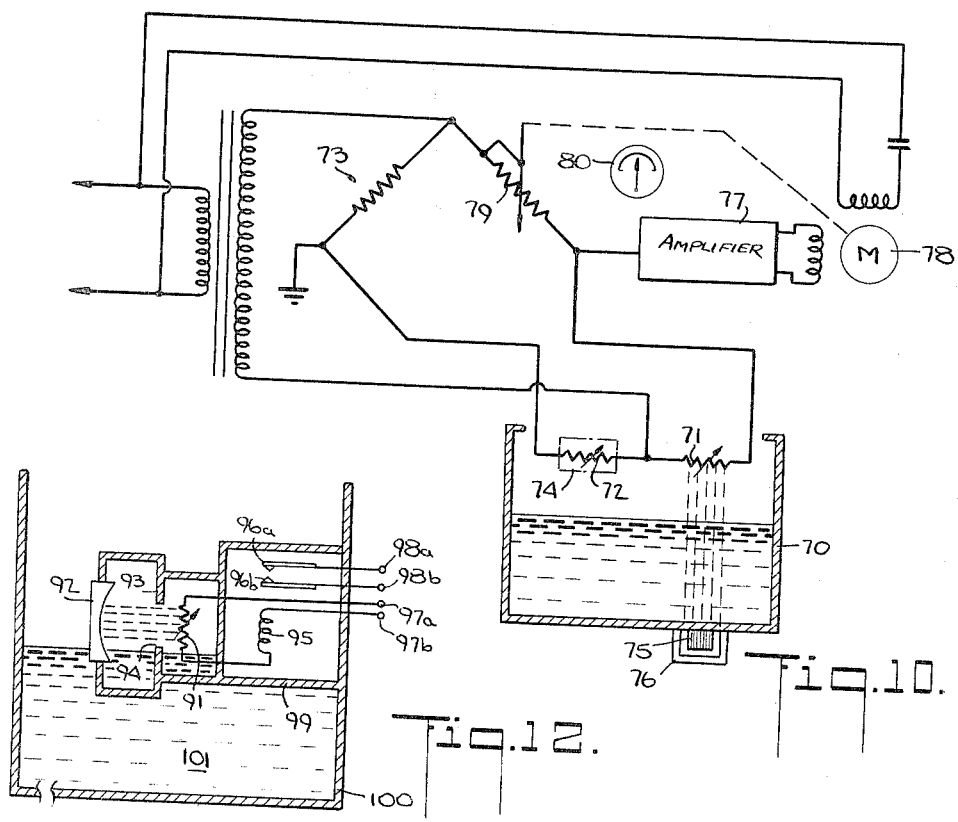
Fig.10.
Fig.12.
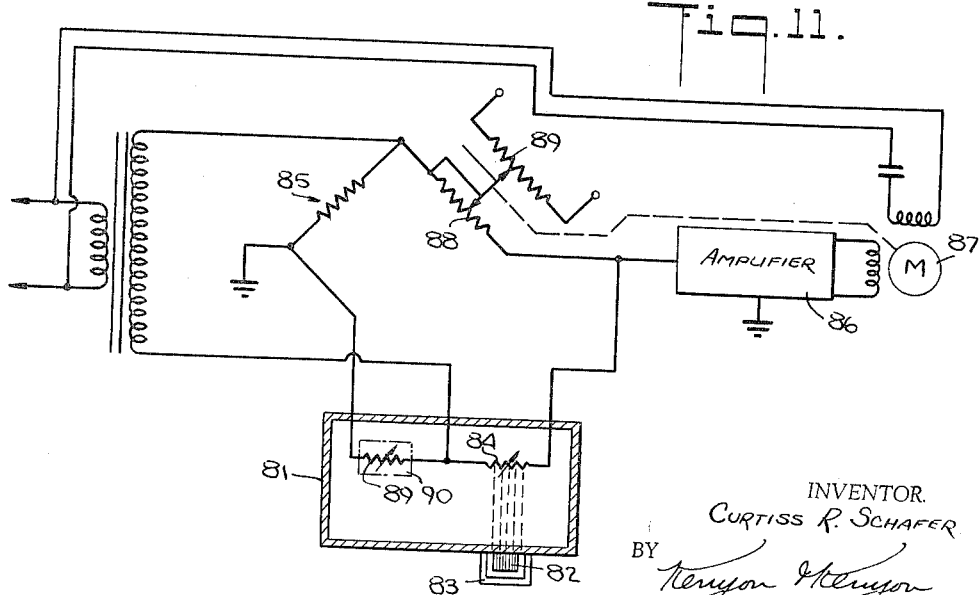
Fig.11.
INVENTOR.
CURTISS R. SCHAFER
BY
Kenyon & Kenyon
ATTORNEYS United States Patent Office 3,244,897
Patented Apr. 5, 1966

3,244,897
MEASUREMENT OF THE MASS OF A MATERIAL IN A CONTAINER BY RADIOACTIVE MEANS
Curtiss R. Schafer, Newtown, Conn., assignor to Simmonds Precision Products Inc., Tarrytown, N.Y., a corporation of New York
Filed June 27, 1962, Ser. No. 205,726
14 Claims. (Cl. 250—43.5)

This invention relates to a gauge device and more particularly to the apparatus and method for the determination of the mass or level of liquid in a container.

Whenever material is stored in a container, tank, or the like the problem of simply and accurately determining the quantity or weight of the material immediately arises. In the case of stationary storage facilities, devices such as floats, sight gauges, calibrated windows, sounding rods, etc., provide an accurate indication of the level and quantity of the material within the storage container. If the material is substantially homogeneous, its density can be determined and from that information, the weight of a measured level or quantity of material within the container can also be computed. Where the stored material is a liquid, the temperature of the material must be known in order to compute its density because of the temperature coefficient of expansion of the liquid.

Normally the problem of determining the quantity or weight of material in stationary containers is simplified by the fact that such containers are commonly constructed with relatively symmetrical and uniform shapes. The determination of the quantity or weight of materials in portable containers and tanks oftentimes presents more difficult problems, such as those related to the measurement of liquids related to transportation equipment. Of course, vehicles such as automobiles and trucks generally employ fuel tanks with substantially rectangular sections so that simple float devices provide sufficiently accurate information concerning fuel quantity. Here cost is the paramount consideration since inaccuracies in determination of the fuel quantity in most cases is merely a matter of inconvenience.

But, as opposed to the more simple techniques which are applicable to ground and sea transportation equipment, the measurement of fuel supplies in aircraft presents particularly difficult problems. In aircraft the fuel is commonly stored in wing tanks, which by necessity are irregularly shaped. Obviously in aircraft equipment, accuracy in fuel measurements is of paramount importance if the craft is to be operated in a safe manner. With the rapid developments in high speed commercial and military aircraft where it is necessary to carry very great quantities of fuel which are consumed at appreciably high rates, more rigid requirements are placed upon the measuring equipment.

Another problem associated with the measurement of fuel in aircraft is that caused by the extremely wide variations in the fuel temperature which may occur. Thus a plane may leave an airport in the tropics with very high ground temperatures and, in a matter of minutes, climb to altitudes where extremely low sub-zero temperatures are present. Under such a condition the temperature change can cause large volumetric changes in the fuel due to its change in density. Obviously, the engine is dependent upon fuel weight flow as opposed to fuel volume flow since weight flow represents a flow of available chemical energy. For this reason, the performance of the aircraft is estimated and checked during operation on a weight flow basis. Consequently, there is a great need for fuel measuring equipment which can at least accurately determine the volume of fuel available and preferably determine the weight of fuel available at any time.

Industry commonly encounters great difficulty in the measurement of the volume, mass or height of liquids due to factors such as the complex shape of the tank, extreme temperature conditions, extreme pressure conditions, corrosive nature of the liquid, etc.

In many applications whether in transportation equipment or permanent ground installations, space requirements present a problem. Measuring equipment which is completely without the tank or container necessarily occupies greater space and can easily interfere with adjacent equipment. The locating of all or a substantially part of the measuring equipment without the tank can also increase problems such as transmission error and the like.

One of the objects of the invention is to provide a device for determining the mass of material in a container.

Another object of the invention is to provide a device capable of directly determining the weight of liquid in a container.

A further object of the invention is to provide a device for determining the quantity or weight of liquid in a container without the need of moving parts in engagement with the liquid.

A still further object of the invention is to provide a device for determining the weight of liquid in a container with compensation for temperature induced density changes.

An additional object of the invention is to provide a method for determining the mass of material in a container which has a non-uniform shape.

A further object of the invention is to provide a device which is actuated in response to a predetermined level of liquid.

For a better understanding of the invention as well as other objects and further features thereof, reference is made to the following detailed description to be read in conjunction with the attached drawings in which:

FIG. 1 is an elevational section view showing the invention disposed within a liquid tank;

FIG. 2 is a plan view showing both the means for providing a source of radiation and the means for responding to the radiation disposed adjacent one another within the tank;

FIG. 3 is an elevational view of the sensor responsive to the radiation which has conductive terminals disposed along its vertical edges;

FIG. 4 is another embodiment of the sensor responsive to the radiation which has conductive terminals disposed along its upper and lower edge portions;

FIG. 5 is a vertical section view showing a means for adjusting the spacing between the source and the sensor in order to compensate the device;

FIG. 6 is a vertical section view of the source of radiation and/or means responsive to it which are adapted for an irregularly shaped tank;

FIG. 7 is a schematic representation of a temperature compensated system for indicating the output of the liquid measuring device;

FIG. 8 is a schematic representation of an indicating circuit for the measuring device of the invention;

FIG. 9 is a schematic representation of a system for indicating the density of a liquid;

FIG. 10 is a schematic representation of a system for indicating liquid measurement in which the sensor is compensated for temperature by means of a shielded sensor element;

FIG. 11 is a schematic representation of an additional system for indicating the density of a liquid;

FIG. 12 is a schematic representation of a switch device responsive to liquid level.

In one embodiment the invention for determining the level of material adjacent thereto comprises means for providing a source of radiation and means spaced apart from said source for responding to the radiation therefrom. The radiation received by the responding means from the source of radiation is dependent upon the presence of the material therebetween due to the absorption of the radiation upon passing through the material. At least one of the source and the material responsive means are adapted to be disposed within the material with at least a portion of the material extending between the source and responding means. The device further includes means for sensing the response of the responding means to variations in the radiation received from the source.

In another embodiment the invention comprises a device for determining the mass or weight of material in a container.

In still another embodiment of the invention the device includes a source of radiation comprising material in the spectral range of gamma and X-rays.

In a further embodiment of the invention, the spacing between the source and responding means is adapted to be adjusted in order to compensate the device.

In still a further embodiment of the invention the source and responding means are shaped in accordance with the shape of the container in order to provide a more linear indication of the change in mass with change in level of the material.

An additional embodiment of the invention includes an arrangement for compensating the measurements for the temperature induced changes in the sensor of radiation.

A further additional embodiment of the invention includes a switch arrangement responsive to the level of a liquid.

As shown in FIG. 1, measuring device 10 can be disposed within fuel tank 11 which contains a level of fuel 12. The source of radiation includes source strip 13 of radioactive material which is disposed adjacent to sensor strip 14. Source strip 13 and sensor strip 14 are mounted spaced apart from each other by insulators 15 and 16, respectively, within housing 17, the interior of which is in open communication with the interior of fuel tank 11. The basis of operation of the device is the absorption of radiation by the material disposed between the source and responding means. When no material is within the space between the elements, a maximum amount of radiation passes toward the responding means and maximum response follows. As the level of material is increased, the response decreases as the absorption of radiation increases.

The means for providing a source of radiation can be a material capable of producing radiation such as beta or gamma ray radiation. For example, the source of beta rays can be $Sr^{90}$ while for gamma rays, $Co^{60}$ can be used. In certain applications an X-ray tube device can serve as the source of X-ray radiation. The means for responding to the radiation received from the source can be a cell containing a single crystal of CdS for use with gamma and X-ray radiation and a cell containing polycrystalline CdS for use with beta and visible radiation.

When gamma and X-ray radiation sources are employed adequate shielding must be provided to protect personnel and equipment due to the relatively great energy and penetrating power of this type of radiation. On the other hand when beta radiation is employed the minimum amount of shielding, such as that providing by thin (0.060″) aluminum sheet is sufficient due to lower penetrating power.

In the embodiment of the invention as shown in FIG. 7, the source of radiation may be either radioactive materials, such as those emitting beta particles or gamma rays, or an X-ray tube disposed within compartment 18 adjacent to the bottom portion of fuel tank 19. With this arrangement, the radiation passes upwardly toward sensor cell 20, as opposed to the substantially horizontal passage of radiation between source 13 and sensor 14. One or a plurality of sources of radiation can be employed with one or more of a plurality of sensors. The plurality of sources or sensors enable a useable response to be obtained whenever the absorption or the attenuation of the radiation is relatively large due to the distances involved or the nature of the material between the source and sensor.

The means responsive to the radiation from the radiation source in the embodiment of FIG. 1 is strip sensor 14. In either cell 20 or strip 14, cadmium sulphide (CdS) can be used as the sensitive material since its conductivity is proportional to the absorbed radiation and with the arrangements of the invention is therefore proportional to the amount of fuel within the tank. In the embodiment shown in FIG. 7, cell 20 can comprise a single crystal of CdS, which is doped to increase its sensitivity by a factor of 10,000 for example. Such a cell exhibits a linear increase in conductivity upon exposure to gamma ray radiation intensities from less than 0.1 to more than 10,000 R/hr. Thus in the arrangement shown in FIG. 7 gamma ray radiation from source 18, such as a quantity of $Co^{60}$ disposed within shield 18a passes through the liquid disposed within fuel tank 19 to cell 20 in which the conductivity of the CdS is varied.

As with other substances, the fuel within the tank absorbs a certain portion of the radiation so that the intensity of the radiation from the source is diminished in passing toward the sensor. This reduction in intensity of radiation serves as the basis of the measurement of the distance through a depth of material through which the radiation has passed or the presence of the material at a predetermined location. Since the absorption coefficient for the fuel is much greater than that for the air above the fuel, the reduction in the intensity of the radiation from the source to the sensor is therefore substantially that due to passage through the fuel, and, in fact, the reduction of intensity for passage through the air is substantially not measurable.

Even though the density of the liquid to be measured may not be known, cell 20 responds due to the absorption of the radiation in passing from source 18 through liquid 12 to cell 20. The response of cell 20 to the absorption of the radiation serves as a measure of the height of the liquid in terms of its mass so that the on indicator operated by cell 20 will have readings proportional to the weight of the liquid traversed by the radiation.

Since the response to radiation of the CdS material cell itself is affected by temperature changes, compensation for this condition is necessary. This can be done by employing thermistor or other temperature responsive resistive element 21 having the inverse temperature resistance characteristics of cell 20. Element 21 is positioned in such a manner as to experience the same temperature conditions as cell 20.

With the arrangement shown in FIG. 1 and when source strip 13 is adapted to emit beta rays, the fuel within tank 11 absorbs the radiation emitted from the strip with the result that only the exposed portion of sensor strip 14 above the level of fuel receives a substantial amount of radiation. Therefore, the resistance of the sensors is primarily effected by the radiation passing to it in the zone above the fuel. As shown in FIGS. 3 and 4, the strips are provided with terminal portions 23 and 24, respectively, from which extend leads 25 and 26, respectively. Where the terminal portions extend along the side of the strip as shown in FIG. 3, it enables a greater area of terminal surface to be obtained. Where a satisfactory connection can be made with a reduced area, terminal portions 24 attached to the top and bottom ends of the strip are used, as shown in FIG. 4.

In order to detect the change in the conductivity of the means or cell 28 responsive to radiation from source 29, resistance bridge 27 (FIG. 8) can be employed. The responsive means or cell 28 adjacent tank 27a having terminals 28a and b connected into the bridge which includes resistors 30a, 30b and indicating meter 31. Where it is intended that the cell be compensated for temperature, cell 32 which is substantially identical to cell 28 and shielded from radiation can also be inserted into the bridge circuit. Cell 32 is positioned at a location which experiences the same temperature conditions as those of cell 28.

The bridge circuit is energized by power supply 33 which comprises a battery, but a rectified A.C. power supply can be used in lieu of the battery. With this arrangement, indicator 31 can be calibrated to read directly the weight of fuel within the tank. Indicator 31 can be a milliammeter. Its indication will not vary in a linear manner with changes in resistance at cell 28 since changes of resistance in a leg of a simple bridge network are not accompanied by linear changes in the magnitude of the resulting unbalance voltage. However the scale of the indicator can be compensated for this condition.

The arrangement of FIG. 8 is adapted to indicate the true weight or mass of liquid if gamma or X-ray radiation is used. It is also adapted to indicate the level of the liquid if beta radiation is used.

In the place of the bridge circuit shown in FIG. 8, self-balancing bridge circuit 34 shown in FIG. 7 may be employed. One leg of the four-legged bridge comprises sensor cell 20 having terminals 20a and 20b serially connected to shield cell 21 encased in shield 22. The remaining legs of the bridge comprise resistors 35a and 35b as well as potentiometer 36 driven by motor 37. Terminal 34a of bridge 34 is connected directly to ground, while terminal 34b is connected to ground through amplifier 38, the output of which is connected to field 37a of motor 37. With this arrangement, any unbalance condition of bridge 34 provides a drive signal to amplifier 38 which in turn causes operation of motor 37 to position the wiper of potentiometer 36 until the balance of the bridge circuit is restored. The movement of shaft 39 connecting motor 37 to the potentiometer can be provided with indicator 40 which by showing shaft position also shows the depth condition and thereby the weight of fuel within tank 19.

Bridge 34 is energized by transformer 41 having primary winding 41a connected to power source 42. Secondary winding 41b is connected across terminals 34c and d of the bridge in order to energize it and is also connected to winding 37b of motor 37.

Where fuel tank 43 is of a non-uniform shape the variation in fuel quantity and weight will not be linear with respect to the level of fuel. In such a case either the sensor strip, the detector strip, element 44 in FIG. 6, or both the strips can be provided with an irregular form substantially corresponding to the form of the adjacent portions of the tank in order that the change in conductivity of the strip sensor will be substantially linear (FIG. 6).

Where radioactive material emitting gamma rays is used in the form of source strip 13 and the responsive means is in the form of sensor strip 14, the linearity of the device may be affected by variations in the uniformity of source material and/or the responsive material. To maintain linearity, either or both strips may be deformed to vary the spacing between them with the arrangement shown in FIG. 5. The principle underlying this adjustment is the variation in the radiation level with changes in distance from its source. Strips 45 and 46 are mounted by insulators 47 and 48, respectively, within housing 49. Strip 46 is provided with a plurality of studs 50 which are adapted to receive and engage the threaded portions of screws 51 which extend through openings in housing 49. With the plurality of studs and screws engaged, strip 46 can be deformed in a predetermined manner in order to reestablish and maintain the linearity of the output of the device with respect to variations in the level of fuel adjacent to it. The strips can also be adjusted in this manner in order to compensate for variations in the cross-sectional area of the tank wherever the tank has a relatively irregular shape.

As shown in FIG. 9, another embodiment of the invention is adapted for use as a densitometer. Material 52, whose density is to be determined, is placed within container 53. Radioactive source 54 adjacent the container and comprising material such as $Co^{60}$ is adapted to emit gamma rays through material 52 to cell 55 which can include CdS material. Cell 55 can be compensated for temperature effects by connecting in circuit therewith, thermistor or other temperature responsive resistive element 56 having inverse temperature resistance characteristics of cell 55. Element 56 is positioned in such a manner as to experience the same temperature conditions as cell 20. With this arrangement the absorption of the radioactive rays from source 54 will vary in accordance with the density of material 52 disposed within container 53.

The circuit including cells 55 and 56 comprises one leg of bridge 57. Bridge 57 further includes resistor 58 and potentiometer 59 which is driven by shaft 60 of motor 61. Transformer 62 serves as the power supply to the bridge and the motor. An unbalance condition of the bridge results in a drive signal to amplifier 63 which controls motor 61 to position potentiometer 59 until balance is restored.

When operating potentiometer 59 in order to rebalance bridge 57, shaft 60 is also adapted to provide an output shaft position as a function of the density of the material and to operate an output device such as potentiometer 64. The density signal that can be obtained from potentiometer 64 is thereby made available for other equipment requiring density information or compensation such as in conjunction with capacitance-type fuel quantity gauges.

In FIG. 10 there is shown a system for measuring the liquid in tank 70 in which sensor 71 is disposed in one leg and compensating cell 72 in an adjacent leg of bridge network 73. Compensating cell 72 is enclosed in shield 74 in order that the cell be unaffected by the radiation from source 75 mounted within shield 76. The servo system is similar to that shown in FIG. 9. Changes in the height of the liquid in tank 70 affect the degree of absorption of the radiation from source 75 with the result that the response of sensor 71 varies. The change in resistance of sensor 71 in response to the radiation imparted thereto upsets the balance of network 73 with the result that an output signal is applied to amplifier 77. In response to the output signal, the amplifier operates motor 78 which drives potentiometer 79 until balance of the bridge is restored. Indicator 80 driven by motor 78 shows the change in the measurement of the liquid. Since the compensating cell 72 is positioned to be subjected to the same temperature conditions as those at sensor 71, it has substantially the same response to temperature as does the sensor. By placing compensating cell 72 in the leg of the bridge network adjacent to the sensor, temperature compensation is achieved.

In FIG. 11 there is shown a system for indicating the density of a liquid contained within housing 81. The absorption of radiation from source 82 within shield 83 is dependent upon the density of the liquid contained within housing 81. Thus as with most liquids, the density varies with the temperature of the liquid. Sensor 84 is responsive by resistance changes to the radiation received at it from source 82. The change in resistance of the sensor in view of its connection in one leg of the bridge network 85 results in the bridge being unbalanced. The output signal of the bridge network activates amplifier 86 which in turn energizes motor 87. The servo operates until the change in setting of potentiometer 88 reestablishes the balance of the bridge. Potentiometer 89 which is also driven by motor 87 is available as a source of an output signal which reflects a density of the liquid within the housing.

Since sensor 84 is itself response to temperature changes, it is necessary that temperature compensation be introduced. This can be done by the insertion of compensating cell 89 in the leg of the bridge network 85 adjacent to the leg containing sensor 84. The compensating cell which is substantially identical in construction to that of the sensor is enclosed within shield 89 in order that it not be affected by the radiation. Since the compensating cell is positioned to be subjected to the same temperature condition as that of sensor 84, it is capable of introducing compensation into the bridge network. In this arrangement it is necessary that housing 81 be maintained substantially filled with the liquid in order that changes in the radiation imparted upon sensor 84 are only those resulting from the change in absorption in the liquid which accompanies its density changes.

FIG. 12 shows an embodiment of the invention which serves as a liquid level switch. The switch comprises sensor 91 which is responsive to the radiation emitted from source 92. Between the sensor and source there is disposed mask 93 which contains aperture 94. Sensor 91 is connected in circuit with winding 95 which is adapted to actuate relay contacts 96a and 96b. Terminals 97a and 97b provide power to the winding while terminals 98a and 98b are connected to a circuit to be controlled by contacts 96a and 96b. Winding 95 and contacts 96a and 96b are mounted within sealed housing 99 which supports mask 93. The source of radiation such as Sr$^{90}$ is in turn supported by mask 93. The entire assembly is adapted to be mounted within tank 100.

Whenever liquid 101 within the tank is below the location of aperture 94, radiation can pass in an uninterrupted manner to the sensor thereby reducing its resistance and permitting current to flow through winding 95. The flow of current through winding 95 actuates contacts 96a and 96b. Whenever the liquid level is brought to a position where it is disposed between source 92 and aperture 94 of the mask, the radiation being transferred to the sensor is reduced and results in an increase in the resistance of the sensor. By positioning the assembly at a predetermined position within tank 100 the presence or absence of the liquid at that location is sensed by the arrangement. The size of aperture 94 determines the range of operation of the switch. Thus, with a small aperture a snap action type of operation takes place since a small change in the level of liquid will actuate the device. The opposite is true whenever the aperture is of a relatively large size.

In the various arrangements of the inventor, either the source of radiation or the sensor can be located inside or outside of the container adjacent its upper, lower, or side portions. Various radioactive materials can be used as the source of radiation or an X-ray tube can be employed. The X-ray tube has the advantage that its radiation can be terminated at will in order to protect personnel during servicing of the aircraft, but it has the disadvantage of requiring power at high voltage as well as maintenance. The sensor material for the strip form can include polycrystalline CdS material while in the cell arrangement a single crystal of CdS can be used.

In large aircraft, the gauge device of each of a plurality of tanks can be connected to a totalizing circuit to indicate total weight of fuel available at any given time. In small aircraft having a single fuel tank, the device merely requires a stabilized voltage source and milliammeter calibrated in pounds of fuel.

In applications where the required information is merely the level of a body or container of material, the invention is adapted to served as a liquid or material level gauge. The device is also adapted to respond at a single level condition in applications requiring a limit or alarm device.

While certain embodiments of the invention have been shown and described herein, it is to be understood that certain changes, additions and substitutions can be made without departing from the scope and spirit of the invention.

What is claimed is:

1. A device for determining the mass of material in a container comprising means for providing a source of radiation, means spaced apart from source providing means for electrically responding to the radiation received from said source providing means, additional means similar to said responding means and disposed adjacent thereto, said additional means being electrically connected to said responding means, means for shielding said radiation from said additional means, said additional means compensating said respondings means for ambient temperature effects therein, the radiation received by said responding means from said source providing means being dependent upon the presence of said material therebetween, said source providing means and said responding means being adapted to be disposeed adjacent said container with at least a portion of the interior of said container extending between said source providing means and said responding means, and means connected to said responding means and said additional means for sensing the response of said responding means.

2. A device for determining the mass of liquid in a tank having upper and lower end portions comprising means disposed adjacent one of said end portions for providing a source of radiation, means disposed adjacent the other of said end portions for electrically responding to the radiation received from said source providing means, additional means similar to said responding means and disposed adjacent thereto, said additional means being electrically connected to said responding means, means for shielding said radiation from said additional means, said additional means compensating said responding means for ambient temperature effects therein, the radiation received by said responding means from said source providing means being dependent upon the presence of liquid therebetween, and means connected to said responding means and said additional means for sensing the overall response thereof.

3. A device for determining the mass of material in a container comprising means for providing a source of radiation, means spaced apart from source providing means for electrically responding to the radiation received from said source providing means, additional means similar to said responding means and disposed adjacent thereto, means for shielding said radiation from said additional means, the radiation received by said responding means from said source providing means being dependent upon the presence of said material therebetween, said source providing means and said responding means being adapted to be disposed adjacent said container with at least a portion of the interior of said container extending between said source providing means and said responding means, and means for sensing the response of said responding means, including an electrical bridge circuit, one leg of said bridge circuit containing said responding means, and another leg of said bridge circuit containing said additional means, said additional means thereby compensating said responding means for ambient temperature effects therein.

4. A device for determining the mass of material in a container comprising a strip of a radioactive substance adapted to extend in a substantially upward direction adjacent said container, a strip of a substance electrically responsive to the radiation from said radioactive strip disposed spaced apart therefrom and in a substantially facing direction thereto, the radiation received by said responsive strip from said radioactive strip being dependent upon the presence of said material therebetween, and means connected to oppositely disposed edge portions of said responsive strip for sensing the electrical response of said responsive strip.

5. A device for determining the mass of material in a container comprising a strip emitting gamma rays, said emitting strip being adapted to extend in a substantially upward direction adjacent said container, a strip of substantially a single crystal of cadmium sulphide conditioned to be electrically responsive to said gamma rays, said cadmium sulphide strip being disposed spaced apart from and in a substantially facing relationship with said emitting strip, the radiation received by said strip of cadmium sulphide material from said emitting strip being dependent upon the presence of material therebetween.

6. A device for determining the mass of material in a container comprising a strip emitting beta rays, said emitting strip being adapted to extend in a substantially upward direction adjacent said container, a strip of substantially polycrystalline cadmium sulphide conditioned to be electrically responsive to said beta rays, said cadmium sulphide strip being disposed spaced apart from and in a substantially facing relationship with said emitting strip, the radiation received by said strip of cadmium sulphide material from said emitting strip being dependent upon the presence of material therebetween.

7. A gauge for determining the mass of liquid in a tank comprising a tubular housing adapted for insertion in a substantially upwardly extending position within said tank, the interior of said housing being in communication with the interior of the tank, a strip of radoactive material supported within said housing and exposed to the interior thereof, a strip of material electrically responsive to the radiation from said radioactive strip, said responsive strip being supported within said housing and exposed to the interior thereof, said responsive strip being spaced apart from and in a substantially facing relationship with said radioactive strip, the presence of said liquid between said strips determining the radiation received by said responsive strip, and means for sensing the electrical response of said responsive strip.

8. A gauge for determining the mass of liquid in a tank comprising a housing adapted for insertion in a substantially upwardly extending position within said tank, a strip of radioactive material supported within said housing, a strip of material electrically responsive to the radiation from said radioactive strip, said responsive strip being supported within said housing spaced apart from and in a substantially facing relationship with said radioactive strip, the presence of said liquid between said strips determining the radiation received by said responsive strip, means for selectively varying the spacing between said strips to determine the amount of radiation received by said responsive means, and means for sensing the electrical response of said responsive strip.

9. A gauge for determining the mass of liquid in a tank comprising a housing adapted for insertion in a substantially upwardly extending position within said tank, a strip of radioactive material supported within said housing, a strip of material electrically responsive to the radiation from said radioactive strip, said responsive strip being supported within said housing spaced apart from and in substantially facing relationship with said radioactive strip, the presence of said liquid between said strips determining the radiation received by said responsive strip, a plurality of screw members extending from said housing into engagement with at least one of said strips for deforming said strip to vary the spacing between said strips, and means for sensing the electrical response of said responsive means.

10. A gauge for determining the mass of liquid in an irregularly shaped tank comprising a strip of radioactive material adapted to extend in a substantially upward direction adjacent said container, a strip of material electrically responsive to the radiation from said radioactive strip disposed spaced apart therefrom and in substantially facing relationship thereto, the form of at least one of said strips being varied in substantial accordance with the variation in cross-section of said tank to compensate the radiation received by said responsive strip for said variation in cross-section, the radiation received by said responsive strip being dependent upon the presence of said liquid between said strips, and means for sensing the electrical response of said responsive strip.

11. A device for determining the mass of liquid in a container comprising a strip of radioactvie material adapted to extend in a substantially upward direction adjacent said container, a strip of material electrically responsive to the radiation from said radioactive strip disposed spaced apart therefrom and in substantially facing relationship thereto, the radiation received by said responsive strip being dependent upon the presence of said liquid between said strips, terminal members extending substantially along oppositely disposed edge portions of said responsive strip, and means connected to said terminal members for sensing the electrical response of said responsive strip.

12. A device for determining the density of a material subjected to varying ambient conditions comprising means for providing a source of radiation, means spaced apart from said source providing means for responding to the radiation received therefrom, means for compensating said responding means for the effects of ambient conditions thereon, the radiation received by said responding means from said source providing means being dependent upon the presence of said material therebetween, said source providing means, said responding means, and said compensating means being adapted to be disposed adjacent said material with at least a portion of said material extending between said source providing means and said responding means, and means connected to said responding means and said compensating means for sensing the compensated response of said responding means.

13. A liquid level detector comprising structure forming a stationary supporting member adapted to be inserted within a container for liquid at a predetermined level therein adjacent to the predetermined level of liquid to be detected, means mounted on said supporting member for providing a source of radiation, said means for providing a source of radiation being exposed to the liquid within the container, means mounted on said supporting member adjacent said source providing means for responding to the radiation received therefrom, said means for responding to the radiation being exposed to the liquid in the container, a mask mounted on said supporting member and disposed beween said source providing means and said responding means, said mask being exposed to the liquid in the container, said mask having an aperture therein disposed in the path of travel of said radiation to said responding means, said aperture extending over a predetermined distance adjacent to the location of the predetermined level within the container which is to be detected, said predetermined distance being a fraction of the travel of the level of liquid within the container, the radiation received by said responding means being varied by the presence of said liquid adjacent said aperture, said source providing means and said responding means mounted on said supporting member being adapted to be disposed within said liquid with at least a portion of said liquid extending between said source providing means and said responding means, and means connected to said responding means for sensing the response of said responding means.

14. A device for determining the density of a material subjected to varying ambient conditions comprising means for providing a source of radiation, means spaced apart from source providing means for electrically responding to the radiation received from said source providing means, additional means similar to said responding means and disposed adjacent thereto, means for shielding said radiation from said additional means, the radiation received by said responding means from said source providing means being dependent upon the presence of said material therebetween, said source providing means and said responding means being adapted to be disposed adjacent said container with at least a portion of the interior of said container extending between said source providing means and said responding means, and means for sensing the response of said responding means, including an electrical bridge circuit, one leg of said bridge circuit containing said responding means, and another leg of said bridge circuit containing said additional means, said additional means thereby compensating said responding means for ambient temperature effects therein.

References Cited by the Examiner

UNITED STATES PATENTS

| | | | |
|---|---|---|---|
| 2,708,721 | 5/1955 | Ziffer | 250—43.5 |
| 2,800,591 | 7/1957 | Gilman | 250—83.3 |
| 2,877,352 | 3/1959 | Weigel et al. | 250—43.5 |
| 2,933,601 | 4/1960 | Friedman | 250—43.5 |
| 2,952,774 | 9/1960 | Howard | 250—43.5 |
| 2,966,628 | 12/1960 | Bosch | 250—83.3 X |
| 3,011,662 | 12/1961 | Daily | 250—43.5 X |
| 3,060,313 | 10/1962 | Ohmart et al. | 250—83.3 X |
| 3,082,323 | 3/1963 | Chope et al. | 250—83.3 X |

RALPH G. NILSON, *Primary Examiner.*

ARCHIE R. BORCHELT, *Examiner.*